(12) United States Patent
Gupta et al.

(10) Patent No.: US 12,002,030 B2
(45) Date of Patent: Jun. 4, 2024

(54) SYSTEM AND METHOD FOR WIRELESS PAYMENT

(71) Applicant: Reliance Jio Infocomm Limited, Ahmedabad (IN)

(72) Inventors: Ajay Kumar Gupta, Pune (IN); Vishal Vasant Oak, Bengaluru (IN); Anish Shah, Mumbai (IN); Rajeev Gupta, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 705 days.

(21) Appl. No.: 16/973,331

(22) PCT Filed: Jul. 6, 2019

(86) PCT No.: PCT/IB2019/054762
§ 371 (c)(1),
(2) Date: Dec. 8, 2020

(87) PCT Pub. No.: WO2019/234699
PCT Pub. Date: Dec. 12, 2019

(65) Prior Publication Data
US 2021/0248583 A1     Aug. 12, 2021

(30) Foreign Application Priority Data
Jun. 8, 2018   (IN) .............................. 201821021477

(51) Int. Cl.
*G06Q 20/20*        (2012.01)
*G06Q 20/32*        (2012.01)
(Continued)

(52) U.S. Cl.
CPC .......... *G06Q 20/325* (2013.01); *G06Q 20/20* (2013.01); *G06Q 20/36* (2013.01); *H04B 17/318* (2015.01);
(Continued)

(58) Field of Classification Search
CPC ...... G06Q 20/325; G06Q 20/20; G06Q 20/36; G06Q 20/326; G06Q 20/3224;
(Continued)

(56) References Cited

U.S. PATENT DOCUMENTS 9,697,508 B1 *   7/2017   Ramalingam ...... G06Q 30/0239
11,288,657 B1 *  3/2022   Lewis ................. G06Q 20/327

FOREIGN PATENT DOCUMENTS

| CN | 102419846 A | 4/2012 |
| CN | 103198400 A | 7/2013 |

OTHER PUBLICATIONS

International Search Report from the Indian Patent Office in corresponding International Application No. PCT/IB2019/054762 mailed Nov. 8, 2019.
(Continued)

*Primary Examiner* — Clifford B Madamba
(74) *Attorney, Agent, or Firm* — FINNEGAN, HENDERSON, FARABOW, GARRETT & DUNNER, LLP

(57) ABSTRACT

The present invention provides a method and system which facilitates easy and smooth detection of available one or more Point-of-sale (POS) terminals automatically at a merchant's site when a user desires to use a user device in order to pay for services/goods availed by the user device. The present invention provides a scalable, easy to use, seamless, and an efficient method to detect the POS terminals over a Wi-Fi network available to the user equipment. Information corresponding to the detected and available POS terminals are presented on the user device so that the user may easily select an appropriate POS terminal and may initiate the further payment process. The one or more available POS terminals are detected by the user device with the help of a first server device and a second server device.

6 Claims, 9 Drawing Sheets

(51) Int. Cl.
  *G06Q 20/36* (2012.01)
  *G06Q 20/40* (2012.01)
  *G06Q 30/0241* (2023.01)
  *G07G 1/00* (2006.01)
  *G07G 1/14* (2006.01)
  *H04B 17/318* (2015.01)
  *H04W 48/20* (2009.01)
  *H04W 88/08* (2009.01)

(52) U.S. Cl.
  CPC ........... *H04W 48/20* (2013.01); *H04W 88/08* (2013.01); *G06Q 20/326* (2020.05)

(58) Field of Classification Search
  CPC ............. G06Q 20/327; G06Q 20/4015; G06Q 20/4093; G06Q 20/202; G06Q 30/0241; H04B 17/318; H04W 48/20; H04W 88/08; G07G 1/0036; G07G 1/14
  See application file for complete search history.

(56) References Cited

OTHER PUBLICATIONS

Written Opinion of the International Searching Authority from the Indian Patent Office in corresponding International Application No. PCT/IB2019/054762 mailed Nov. 8, 2019.

\* cited by examiner

| BSSID1 | POS1 |
|--------|------|
| BSSID2 | POS2 |
| BSSID3 | POS3 |

FIG 4

| POS1 | Merchant Name : aac<br>POS Terminal Name : bbb<br>Merchant Logo : ccc<br>Store Address : ddd<br>Store Location : eee<br>Discount Code: yyy<br>Payment Processing Options : fff<br>Preferred Payment Option : ggg<br>Post Payment Processing Option : hhh |
|---|---|
| POS2 | Merchant Name : fff<br>POS Terminal Name : acac<br>Merchant Logo : ddd<br>Store Address : efefef<br>Store Location : ggg<br>Discount Code: zzz<br>Payment Processing Options : hhh<br>Preferred Payment Option : thth<br>Post Payment Processing Option : eded |

FIG. 5

SYSTEM AND METHOD FOR WIRELESS PAYMENT

This application is a national stage filing under 35 U.S.C. § 371 of International Application No. PCT/IB2019/054762, filed on Jun. 7, 2019, which claims priority of Indian Patent Application No. 201821021477, filed on Jun. 8, 2018. The contents of these applications are each incorporated herein by reference.

TECHNICAL FIELD

The present disclosure relates generally to wireless networks, and more particularly, to a system and method of secure wireless payment at a user equipment through a digital wallet application.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Digital payment applications including digital wallets are increasingly becoming popular among mobile users for payment at shops and other commercial establishments. This increasing popularity can be attributed to reasons like ease of convenience provided by digital wallet applications in payment processing since the user is not required to put any debit/credit card details, or log into net banking service(s) for payment. Another reason for growth is the use of smart user devices by exponentially increasing large number of people to remain digitally connected to the world. Most people now carry smart user devices, such as a smart mobile device wherever they go.

A mobile phone is an example of a smart mobility wireless cellular connectivity device that allows end users to use services on 2G, 3G or 4G mobile broadband Internet connections with WiFi, NFC, Bluetooth, Zigbee, features and the like. Such user devices are equipped with an advanced operating system which combines features of a personal computer system with other features useful for mobile or handheld use. In recent years, among the unlicensed wireless spectrum, the Wi-Fi technology based on IEEE 802.11 standards has seen tremendous growth and commercialization. Almost all available UE (user equipment) with cellular capability support now possess Wi-Fi capability by default, in order to connect to Wi-Fi networks.

Further, a point of sale (POS) terminal is an electronic hardware device used for processing card payments at retail locations. A POS has the functionality of reading information of a customer's credit or debit card, checking whether the funds in a customer's bank account are sufficient, transferring the funds from the customer's account to the seller's account (or at least, accounts for the transfer with the credit card network) and further recording the transaction and printing the receipt.

Although payment processing, at a merchant's Point of Sales (POS) terminal, is convenient via a digital wallet, the identification of a POS terminal on the digital wallet application is mostly a manual process, thereby causing inconvenience to users and this manual process is susceptible to human error. Conventional methods of identifying the POS terminal in the digital wallet application necessitates the user to input a mobile number linked to a POS terminal, and/or prompts the user to scan a QR code or bar code linked to a POS terminal.

Already known solutions for detecting merchant terminals on digital wallet applications are based on:
a) Prompting the user to manually input a mobile number as an identifier for one or more POS terminals hosted by a merchant. This process is inconvenient for the consumer and is subjected to human error if the typed mobile number does not exactly match to the corresponding mobile number linked to the required POS terminal. Further, the merchant needs to communicate the mobile number to the consumer either verbally or via appropriate display.
b) Prompting the user to scan a QR code linked to one or more POS terminals hosted by a merchant. Although the user need not the use keyboard in this process, however still, it could be inconvenient as the QR code needs to be scanned correctly in order to identify the merchant. Further, the merchant needs to communicate the QR code to the consumer via appropriate display so that the consumers can easily access the same.
c) Using iBeacon technology, however, such process would require at least Bluetooth 4.0+ support on the user devices and would require dedicated iBeacon transmitters to be acquired by merchants which are then installed at POS terminal locations. Clearly, the use of such methods and system are cost ineffective which will create inconvenience to users.

Therefore, there is a need for a system and method that ensures easy and smooth detection of available POS terminals automatically at a merchant's site when a user desires to use a payment application for payment of services/goods sold by the merchant.

SUMMARY

This section is provided to introduce certain objects and aspects of the present disclosure in a simplified form that are further described below in the detailed description. This summary is not intended to identify the key features or the scope of the claimed subject matter. In order to overcome at least a few problems associated with the known solutions as provided in the previous section, an object of the present disclosure is to provide a method and system to ensure easy and smooth detection of available POS terminals automatically at a user device when the user desires to use a digital wallet application for payment of services/goods sold by the merchant. Another object of the present disclosure is to provide a system and method of wireless payment without any manual intervention to identify available POS terminals. Yet another object of the present disclosure is to provide users and merchants with a system and method of wireless payment that enables them to receive seamless payment services without any latency. Yet another object of the present disclosure is to provide features and ability to handle high volume of payments concurrently in a Wi-Fi ecosystem.

A first aspect of the present disclosure relates to a method of wireless payment, wherein the method begins with transmitting, from a user equipment to a first server device, a UE identifier, one or more advertised service set identifiers and a signal strength information associated with the one or more advertised service set identifiers. The one or more advertised service set identifiers correspond to one or more access points from which wireless signals are received by the user equipment. Next, the received advertised service set identifiers, the UE identifier, the signal strength information and a first server device identifier is transmitted from the first server device to a second server device. Subsequently, a first list is generated by the second server device, said first list based on the received one or more advertised service set identifiers, the UE identifier and the first server device identifier. This first list comprises one or more valid service set identifiers and at least one POS terminal identifier corresponding to each of said valid service set identifiers. Thereafter, the first list is transmitted from the second server device to the first server device, where a second list is generated based on the first list. This second list comprises said at least one POS terminal identifier corresponding to each of said valid service set identifiers and an additional information corresponding to said at least one POS terminal identifier. Subsequently, the second list is transmitted by the first server device to the user equipment, where such second list is displayed. The at least one POS terminal corresponding to said at least one POS terminal identifier in the second list is available for wireless payment. Lastly, the method includes receiving, at the user equipment, an input indicating selection of a payment processing option for wireless payment, wherein said payment processing option is selected from the displayed second list.

Another aspect of the disclosure relates to a system of wireless payment, comprising at least one POS terminal connected to one or more access points, wherein said access points are associated with one or more service set identifiers and said access points are configured to transmit wireless signals. The system further comprises a user equipment configured to receive wireless signals from the one or more access points; identify one or more advertised service set identifiers corresponding to the one or more access points based on the received wireless signals; determine a signal strength information of the received signals associated with the one or more service set identifiers; and transmit a UE identifier, said one or more advertised service set identifiers and the signal strength information associated with the one or more advertised service set identifiers. The system also comprises a first server device connected to the user equipment, said first server device configured to receive said UE identifier, said one or more advertised service set identifiers and said signal strength information, from the user equipment; and transmit the received one or more advertised service set identifiers, the UE identifier and a first server device identifier. Further, the system also comprises a second server device connected to the first server device and said at least one POS terminal, wherein said second server device configured to receive one or more advertised service set identifiers, the UE identifier and the first server device identifier, from the first server device, and generate a first list based on the same. This first list comprises one or more valid service set identifiers and at least one POS terminal identifier corresponding to each of said valid service set identifiers. The second server device transmits the first list to the first server device wherein, the first server device is further configured to generate a second list based on the first list, wherein the second list comprises said at least one POS terminal identifier corresponding to each of said valid service set identifiers and an additional information corresponding to said at least one POS terminal identifier, and transmit the second list to the user equipment. The user equipment is further configured to display the second list, wherein the at least one POS terminal corresponding to said at least one POS terminal identifier in the second list is available for wireless payment; and receive an input indicating selection of a payment processing option for wireless payment, wherein said payment processing option is selected from the displayed second list.

Another aspect of the disclosure relates to a first server device comprising a receiver configured to receive, from a user equipment, a UE identifier, one or more advertised service set identifiers and signal strength information associated with the one or more advertised service set identifiers, wherein the one or more advertised service set identifiers correspond to one or more access points from which wireless signals are received by the user equipment. The first server device also comprises a transmitter connected to the receiver, said transmitter configured to transmit the received one or more advertised service set identifiers, the UE identifier and a first server device identifier, to a second server device. The receiver is further configured to receive from the second server device, a first list comprising one or more advertised valid service set identifiers, the signal strength information and at least one POS terminal identifier corresponding to each of said valid service set identifiers. The first server device also comprises a processor configured to process the first list to generate a second list comprising said at least one POS terminal identifier corresponding to each of said valid service set identifiers and an additional information corresponding to said at least one POS terminal identifier. The transmitter of the first server device transmits this second list to the user equipment, where the second list is displayed such that the at least one POS terminal, corresponding to said at least one POS terminal identifier in the second list is available for the wireless payment. Further, an input indicating selection of a payment processing option is received at the user equipment, wherein said payment processing option is selected from the displayed second list.

Yet another aspect of the disclosure relates to a second server device comprising a receiver configured to receive, from a first server device, one or more advertised service set identifiers, a UE identifier and a first server device identifier, wherein the one or more service set identifiers and the UE identifier are received by the first server device from a user equipment, and the one or more advertised service set identifiers correspond to one or more access points from which wireless signals are received by the user equipment. The second server device further comprises a processor connected to the receiver, said processor configured to process the received one or more advertised service set identifiers, the UE identifier and the first server device identifier to generate a first list comprising one or more valid service set identifiers and at least one POS terminal identifier corresponding to each of said valid service set identifiers. The second server device also comprises a transmitter connected to the receiver and the processor, said transmitter configured to transmit the first list to the first server device, wherein a second list is generated by the first server device based on the received first list. This second list comprises at least one POS terminal identifier corresponding to each of said valid service set identifiers and an additional information corresponding to said at least one POS terminal identifier, and is displayed at the user equipment. The at least one POS terminal corresponding to said at least one POS terminal identifier in the second list is available for the wireless payment, and the user equipment receives an input indicating selection of a payment processing option, said payment processing option being selected from the displayed second list.

Yet another aspect of the invention relates to a user equipment comprising a transceiver configured to receive signals from one or more access points located in vicinity of one or more POS terminals. The user equipment also comprises a processor configured to identify one or more advertised service set identifiers corresponding to the one or more access points based on the received signals and determine a signal strength information of the received signals associated with the one or more service set identifiers. The transceiver is further configured to transmit a UE identifier, the one or more advertised service set identifiers and the determined signal strength information to a first server device which then transmits the same along with a first server device identifier, to a second server device.

The second server device generates a first list based on the received one or more advertised service set identifiers, the UE identifier and the first server device identifier, wherein the first list comprises one or more valid service set identifiers and at least one POS terminal identifier corresponding to each of said valid service set identifiers, and said second server device transmits the first list to the first server device. The transceiver of the user equipment is further configured to receive a second list from the first server device, said second list comprising said at least one POS terminal identifier corresponding to each of said valid service set identifiers and an additional information corresponding to said at least one POS terminal. The user equipment also comprises a graphical user interface configured to display the second list wherein at least one POS terminal, corresponding to said at least one POS terminal identifier in the second list is available for wireless payment, and receive an input indicating selection of a payment processing option for wireless payment, wherein said payment processing option is selected from the displayed second list.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

FIG. 4 illustrates an exemplary first list generated by the second server device [120], in accordance with exemplary embodiments of the present disclosure.

FIG. 5 illustrates an exemplary second list generated by the first server device [110], in accordance with an embodiment of the present disclosure.

Figure 1:
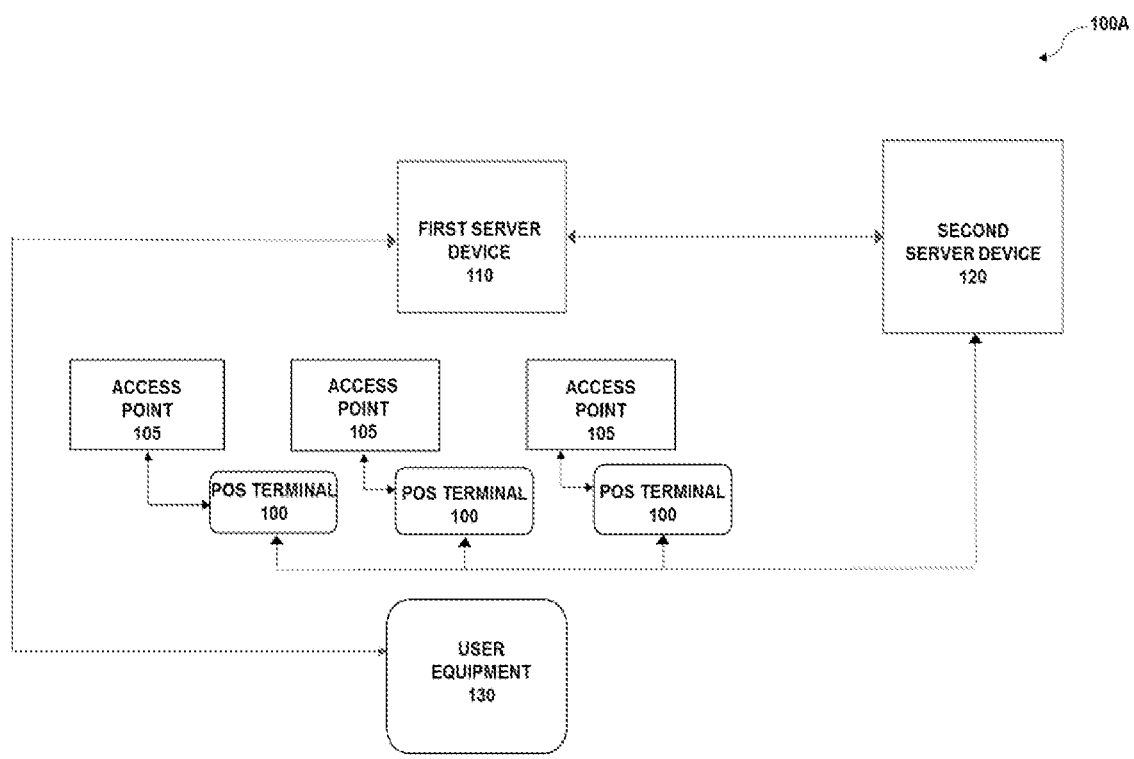
FIG. 1 illustrates an architecture of a system [100A] of wireless payment, in accordance with exemplary embodiments of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention provides a method and system which facilitates easy and smooth detection of an available one or more Point-of-sale (POS) terminals automatically at a merchant's site when a user desires to use a user device in order to pay for services/goods availed by the user device. The present invention provides a scalable, easy to use, seamless, and an efficient method to detect the POS terminals over a Wi-Fi network available to the user device. Information corresponding to the detected POS terminals are presented on the user device so that the user may easily select an appropriate POS terminal and may initiate the further payment process. Automatic detection of POS terminals adds a convenience aspect to the use of digital wallets, thereby prompting more and more users to opt for the digital wallets while paying at the merchant site.

As used herein, the "user device" or "user equipment" refers to any electrical, electronic, electromechanical and computing device. User equipment may have at least a processor, a display, a memory and an input means such as a hard keypad and/or a soft keypad. The user device may include, but not limited to, a mobile phone, a tablet, a smartphone, a laptop, a wearable device, a phablet, a personal digital assistant and any such device obvious to a person skilled in the art. The terms "user device" and "user equipment" have been used interchangeably throughout the specification.

As used herein, the "Wi-Fi network" is facilitated by one or more access points which are Wi-Fi access points/routing devices, wherein the Wi-Fi access points/routing devices may refer to a device connected to the core network through high-speed backhaul wired connection (such as a local area network (LAN) connection with optical fiber cable/FTTx (fiber to the X), unlicensed band radio (UBR), microwave, satellite, point-to-multipoint/peer-to-peer wireless link, Wi-Fi, millimeter-wave multi-node wireless backhaul) and providing at least one of a public wireless network and a private wireless network to the user device. Further, the one or more access points may operate using conventional wireless technologies such as 802.11 a/b/g/n/ac/ah. Such one or more access points may include, but not limited to, a router, a customer premise equipment (CPE), an optical network terminal (ONT), a modem, a cloud terminal, and any such device that is obvious to a person having ordinary skill in the art.

As used herein, a "processing unit" or "processor" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, "connect", "configure", "couple" and its cognate terms, such as "connects", "connected", "configured" and "coupled" may include a physical connection (such as a wired/wireless connection), a logical connection (such as through logical gates of semiconducting device), other suitable connections, or a combination of such connections, as may be obvious to a skilled person.

As used herein, "send", "transfer", "transmit", and their cognate terms like "sending", "sent", "transferring", "transmitting", "transferred", "transmitted", etc. include sending or transporting data or information from one unit or component to another unit or component, wherein the content may or may not be modified before or after sending, transferring, transmitting.

As used herein, a "digital wallet application" refers to an electronic service or application, which when executed or installed at a user equipment, allows to make an electronic transaction or payment. Electronic transaction may include sending and receiving payments. The digital wallet application allows users to make individual profiles or accounts that can be linked to the user's bank account.

As used herein, the "first server device" refers to a centralized resource or device dedicated to manage the services of a digital wallet application. As used herein, the "second server device" refers to a centralized resource or device dedicated to manage the POS terminals of a particular merchant.

As used herein, a "POS terminal" refers to an electronic device used to process electronic payments at a merchant store. A POS have the functionality of reading information of a customer's credit or debit card, checking whether the funds in a customer's bank account are sufficient, transferring the funds from the customer's account to the seller's account (or at least, accounts for the transfer with the credit card network) and further recording the transaction and printing the receipt.

Referring to FIG. 1, an exemplary architecture of a system [100A] providing wireless payment, is disclosed in accordance with exemplary embodiments of the present invention. The system [100A] includes Point-of-Sale (POS) terminals [100] and access points [105], wherein the access points [105] are in vicinity of the POS terminals [100]. In one embodiment, the access points [105] may be located within the same premises as of the POS terminals [100]. In another embodiment, the access points [105] may be located within a pre-determined radius from the POS terminals [100]. The POS terminals [100] are also connected to a second server device [120].

The system [100A] further includes a user equipment [130] which is communicatively coupled or connected to a first server device [110]. In an embodiment, the user equipment [130] may be connected with the first server device [110] via any cellular or wireless network including, but not limited to, 5G network, Long-Term Evolution (LTE) network and a Global System for Mobile communication (GSM) network. The first server device [110] is further communicatively coupled/connected to a second server device [120] via a wired or a wireless network. In an event, a user desires to use the user device [130] for payment of goods or services at a merchant's site, the user equipment [130] communicates with the first server device [110] in order to present available POS terminals which may be used by the user for making a payment to the merchant. For enabling the user equipment [130] to present the available POS terminals, the first server device [110] communicates with the second server device [120] to determine the available POS terminals which may be used by the user of the user equipment [130].

More particularly, the access points [105] are associated with one or more service set identifiers. The invention encompasses that each access point [105] is associated with a unique service set identifier. In an embodiment, the service set identifier is a Basic Service Set Identifier (BSSID). The BSSID may be the same as the MAC address of the access point [105] or may be a randomly generated identifier in case of ad-hoc Wi-Fi network. The access points [105] are configured to transmit wireless signals, wherein the signals include the service set identifier of the corresponding access point [105].

The user equipment [130] is configured to receive signals from one or more access points [105] and identify one or more advertised service set identifiers corresponding to the one or more access points [105] based on the received wireless signals. Thus, the user equipment [130] is capable of identifying the access points in the vicinity of the POS terminal [100] and the user equipment [130]. The user equipment [130] is further configured to determine a signal strength information of the received signals associated with the one or more service set identifiers. The user equipment [130] is also configured to transmit a UE identifier, said one or more advertised service set identifiers and the signal strength information associated with the one or more advertised service set identifiers to the first server device [110]. The UE identifier is a unique identifier of the user equipment [130].

The first server device [110] is configured to receive the UE identifier, one or more advertised service set identifiers and the signal strength information, from the user equipment [130], and transmit the same along with and a first server device identifier to the second server device [120]. The first server device identifier is a unique identifier of the first server device [110].

The second server device [120] is configured to receive one or more advertised service set identifiers, the UE identifier and the first server device [110] identifier, from the first server device [110] and generate a first list based on the received one or more service advertised set identifiers, the UE identifier and the first server device [110] identifier. The second server device [120] is also configured to receive the POS terminal identifiers and the corresponding service set identifiers from the POS terminals [100]. The first list comprises one or more valid service set identifiers and at least one POS terminal identifier corresponding to each of said valid service set identifiers. The valid service identifiers are those service set identifiers for which a valid POS terminal exist. Therefore, for each of the received advertised service set identifier, the second server device 120 checks if a valid POS terminal exists for the service set identifier. If a valid POS terminal exists for a particular service set identifier, such identifier is marked as a valid service set identifier and is included in the first list. On the other hand, if a valid POS terminal does not exist for a particular service set identifier, then such a service set identifier is removed or discarded and is not included in the first list. The second server device [120] is configured to transmit the first list to the first server device [110].

The first server device [110] is configured to receive the first list from the second server device [120] and generate a second list based on the first list, wherein the second list comprises said at least one POS terminal identifier corresponding to each of said valid service set identifiers and an additional information corresponding to said at least one POS terminal identifier. The additional information includes one or more of a merchant logos, a merchant name, a store address, a store location, at least one payment processing option and at least one preferred payment option. The second server device [120] is further configured to transmit the second list to the user equipment [130].

The user equipment [130] is configured to display the second list, wherein the at least one POS terminal corresponding to said at least one POS terminal identifier in the second list is available for wireless payment, and receive an input indicating selection of a payment processing option for wireless payment, wherein said payment processing option is selected from the displayed second list.

Although only a limited number of user equipment [130], POS terminals [100], access points [105], first server device [110] and second server device [120] are shown with reference to FIG. 1, however, it will be appreciated by those skilled in the art that the invention encompasses use of multiple such units.

Figure 2:
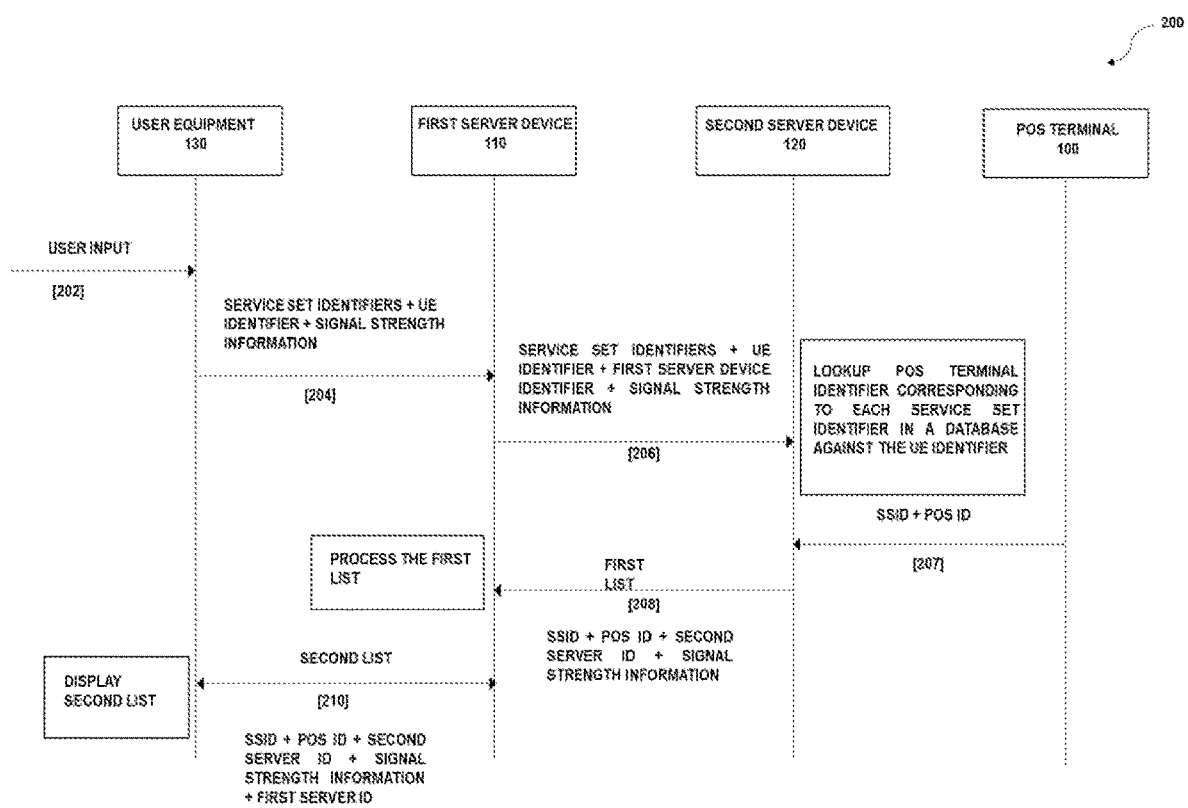
FIG. 2 illustrates a message sequence depicting interactions between a user equipment [130], a first server device [110], and a second server device [120], in accordance with exemplary embodiments of the present disclosure.

Referring to FIG. 2, a message sequence depicting interactions between the user device [130], the first server device [110], and the second server device [120], is shown. At sequence 202, one or more user inputs are received on the user device [130] from a user. Subsequently, at sequence 204, the user equipment [130] transmits the UE identifier, service set identifiers corresponding to access points in the vicinity of the user equipment [130] and signal strength information associated with these service set identifiers. The first server device [110], in sequence 206, transmits the received service set identifiers, UE identifier, signal strength information and a first server device identifier to the second server device [120]. Next, at 207, the POS terminals [100] provide the POS terminal identifier and the corresponding service set identifiers to the second server device [120]. The second server device [120] then performs a lookup operation in a database to identify valid POS terminal identifiers corresponding to each of the service set identifiers. Next, at sequence 208, the second server device [120] transmits the first list to the first server device [110] which processes the first list to generate a second list comprising at least one valid POS terminal identifiers along with an additional information corresponding to said at least one POS terminal identifier. At sequence 210, the first server device [110] transmits the second list to the user equipment [130] where the second list is displayed to the user.

Figure 3:
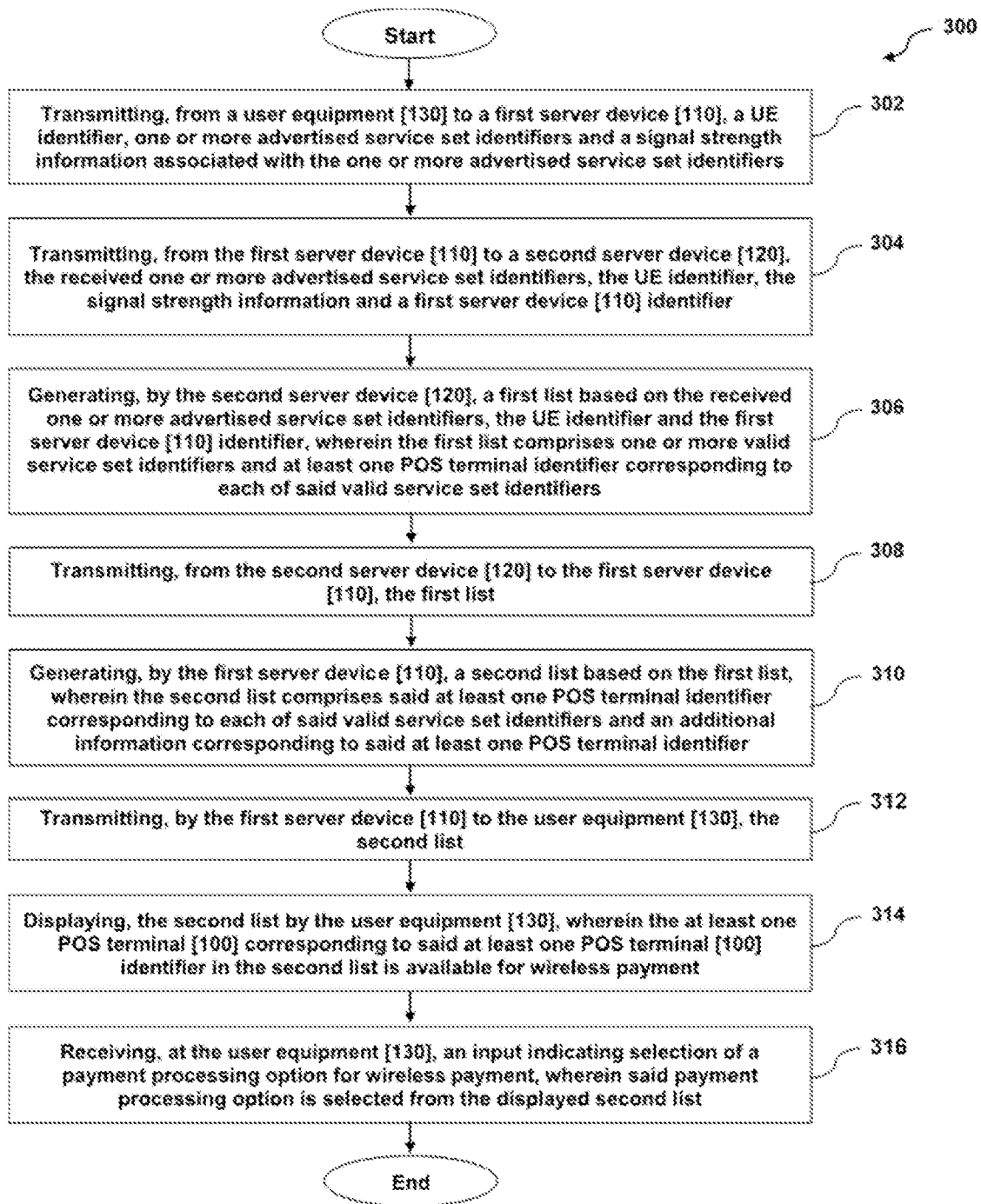
FIG. 3 illustrates an exemplary method flow diagram [300] depicting method of wireless payment, in accordance with exemplary embodiments of the present disclosure.

FIG. 3 illustrates an exemplary method flow diagram [300] depicting method of wireless payment, in accordance with exemplary embodiments of the present disclosure. The method begins when at one of the POS terminals [100], the user decides to make a payment using digital wallet application for the goods and services availed by the user. In one embodiment, the user may select an option of paying through a digital wallet application executed on the user device [130]. Once, the digital wallet option is selected by a user, the selection of digital wallet application may be received as a user input by the user equipment [130]. In another embodiment, the user input may refer to, but not limited to, a voice command, an input received through gesture control on the user equipment [130], and type commands received through I/O interfaces of the user equipment [130]. For instance, when a user opens a digital wallet application on its user equipment [130] and initiates transaction request by selecting an option to pay at a POS terminal, such selection may be considered as a user input. In another example, when the user opens a digital wallet application on its user equipment [130], such an app-open request/action may be considered as the user input.

Once the user input is received by the user device [130] from a user, the user device [130] starts receiving wireless signals from the access points [105] located in vicinity of the POS terminals [100] or the user equipment [130]. In one embodiment, the signals from the one or more access points may be continuously received by the user device [130] passively, irrespective of the user input by the user. The user equipment [130] also obtains signal strength information of the signals received from the access points [105]. Further, based on the received signals, the user device [130] determines the advertised service set identifiers of each of the access points [105]. In one embodiment, each of the advertised service set identifiers refer to Basic Service Set Identifier (BSSID) in accordance with 802.11 wireless standards. In one embodiment, the user device [130] may receive signals from the access points [105] on more or more channels on either, or both of 2.4 GHz and 5 GHz band.

The method then proceeds to step 302 wherein a UE identifier, one or more advertised service set identifiers and signal strength information associated with the one or more advertised service set identifiers are transmitted from the user equipment [130] to a first server device [110]. In one embodiment, the UE identifier refers to a unique identification number assigned to the user device [130]. In another embodiment, the UE identifier may refer to a unique identification number generated by a digital wallet application executed on the user device [130].

Subsequently, the first server device [110] receives the transmitted signal strength information of the signals received from the access points [105], the advertised service set identifiers of each of the access points [105] and the UE identifier of the user device [130]. At step 304, the first server device [110] further transmits the received service set identifiers of each of the access points [105], the UE identifier, the signal strength information and a first server device identifier to the second server device [120]. In one embodiment, the first server device [110] and the second server device [120] may communicate with each other through a wireless connection. In another embodiment, the first server device [110] and the second server device [120] may communicate with each other through a wired connection.

The second server device [120] receives the advertised service set identifiers of each of the access points [105], the UE identifier, the signal strength information and the first server device identifier from the first server device [110]. The second server device [120] also receives the POS terminal identifiers and the service set identifiers from the POS terminals [100]. Based on this received data, the second server device [120], at step 306, generates a first list. The first list comprises one or more valid service set identifiers and at least one POS terminal identifier corresponding to each of said valid service set identifiers. Generating the first list includes performing a look-up operation on a database, by the second server device [120], for each of the received service set identifiers to determine merchant POS terminal identifiers corresponding to valid POS terminals mapped to each of the service set identifiers. If a valid POS terminal exists for a particular service set identifier, such a service set identifier and corresponding POS terminal identifier is included in the first list. If a valid POS terminal does not exist for a particular service set identifier, such a service set identifier is excluded from the first list. The POS terminals whose terminal identifiers are mapped in the first list are those POS terminals which are available for payment to be processed by the user equipment [130]. Details of the first list are explained in the ensuing paragraphs with reference to the FIG. 4.

The invention encompasses sorting the first list based on the signal strength information associated with the advertised service set identifiers, wherein the sorted first list includes advertised service set identifiers with highest signal strength on the top of the list. In an embodiment, sorting of the first list occurs after the first list is generated. In another embodiment, the received service set identifiers are first sorted based on the signal strength information and thereafter, a first list is generated. In this embodiment, the service set identifiers for which signal strength information is below a pre-defined threshold may be removed and a lookup for POS terminal identifiers for such service set identifiers may not be performed.

At step 308, the first list or the sorted first list is transmitted from the second server device [120] to the first server device [110]. The first server device [110] receives the first list from the second server device [120]. Subsequently, at step 310, the first server device generates a second list based on the first list. The second list comprises said at least one POS terminal identifier corresponding to each of said valid service set identifiers and an additional information corresponding to said at least one POS terminal identifier. Generating the second list includes performing a lookup operation on a database to retrieve additional information related to each of the POS terminal identifiers included in the first list. The retrieved additional information for each of the identifiers, are included in the second list. In one exemplary embodiment, the retrieved additional information may include, but not limited, to merchant name, POS terminal name, merchant logo, store address, store location, payment processing options, preferred payment option, and post payment processing option.

The invention encompasses sorting the second list based on the signal strength information of the valid service set identifiers in the first list, wherein the valid service set identifiers with highest signal strength on the top of the list. In an embodiment, sorting of the second list occurs after the second list is generated. In another embodiment, the valid service set identifiers received at the first server device [110] are first sorted based on the signal strength information and thereafter, a second list is generated. In this embodiment, the valid service set identifiers for which signal strength information is below a pre-defined threshold may be removed and a lookup for additional information for such service set identifiers may not be performed.

Next, at step 312, the second list or the sorted second list is transmitted by the first server device [110] to the user equipment [130]. The user equipment [130] receives the second list from the first server device [110]. Subsequently, at step 314, the user equipment [130] displays the second list. The POS terminals corresponding to the POS terminal identifiers included in the second list are available to the user for wireless payment through the digital wallet application on the user equipment [130]. In one exemplary embodiment, the user device [130] may display the second list on a display of the user device [130].

Next, at step 316, an input indicating selection of a payment processing option for wireless payment is received at the user equipment [130]. The input is received via one or more input means of the user equipment [130] from the user, in response to the display of the second list at the user equipment [130]. The selection of the payment processing option may include the user selecting on one of the POS terminal identifiers displayed on the user equipment, for instance by tapping on a specific POS terminal identifier. The input of selection of the payment processing option indicates the user's choice to select one of the available POS terminals displayed in the second list.

Once the input for payment processing option is received, the exemplary method 300 terminates and the payment is processed using the digital wallet application, the first server device and the second server device in accordance with any known payment processing options. The invention also encompasses receiving, at the user equipment [130], an input indicating the selection of a preferred payment option, wherein the preferred payment option indicates the user's preference to choose a particular POS terminal over other available POS terminals displayed in the second list. For instance, the user may mark a particular POS terminal as a favorite POS terminal for making payment. Further, the invention also encompasses receiving, at the user equipment [130], an input indicating user's choice of availing a discount. For instance, the user may click on the discount code displayed in the second list to indicate that he/she wishes to avail such discount.

Although the method of wireless payment, in accordance with exemplary embodiments of the present disclosure, has been described with reference to one user equipment [130] in FIG. 3, however, it will be appreciated by those skilled in the art that the invention encompasses a method of wireless payment for multiple user equipment simultaneously.

Figure 4:
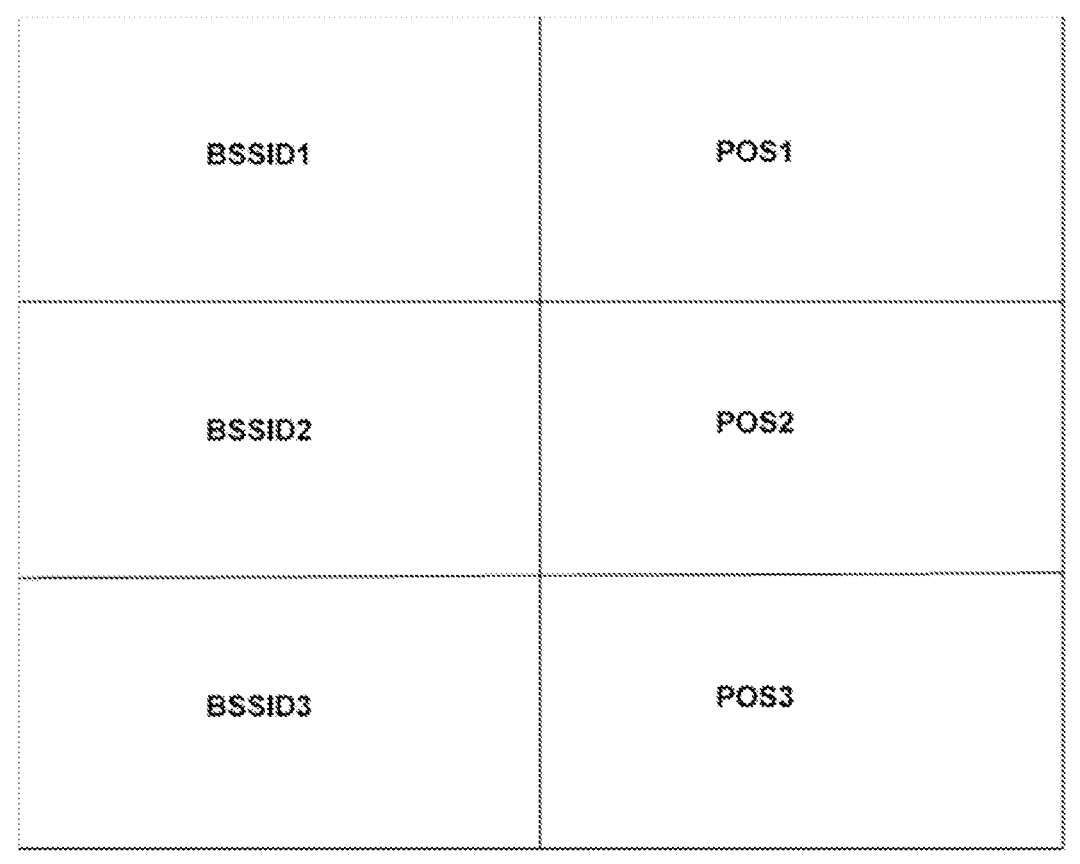

FIG. 4 illustrates an exemplary first list generated by the second server device [120], in accordance with exemplary embodiments of the present disclosure. As shown in FIG. 4, the first list comprises at least of the valid service set identifiers determined by the second server device [120] and corresponding POS terminal identifiers for the valid service set identifiers. As shown, BSSID1, BSSID2 and BSSID3 are the valid service set identifiers, i.e. those identifiers for which a valid POS terminal exists. The POS1, POS2 and POS3 are the POS terminal identifiers of the one or more POS terminals 100, that are corresponding to the valid service set identifiers BSSID1, BSSID2 and BSSID3. The POS terminal identifier POS1 is the identifier of the valid POS terminal for the BSSID1. Similarly, POS terminal identifier POS2 is the identifier of the valid POS terminal for the BSSID2, and POS terminal identifier POS3 is the identifier of the valid POS terminal for the BSSID3. As explained above, the invention encompasses sorting the first list based on the signal strength information of the service set identifiers. For instance, the first list shown in FIG. 4 may be sorted such that the BSSID with highest signal strength is included at the top. Although only a limited amount of valid service set identifiers and POS terminal identifiers are shown in FIG. 4, it will be appreciated by those skilled in the art that the reference to FIG. 4 is only exemplary and any number of valid service set identifiers and POS terminal identifiers may be included in the first list without departing from the scope of the invention.

FIG. 5 illustrates an exemplary second list generated by the first server device [110], in accordance with an embodiment of the present disclosure. As shown in FIG. 5, the second list comprises of the POS terminal identifiers POS1 and POS2, and additional information for each of the POS terminal identifiers. For instance, as shown in FIG. 5, the additional information of POS1 includes: Merchant Name: aac; POS Terminal Name: bbb; Merchant Logo: ccc; Store Address: ddd; Store Location: eee; Discount Code: yyy Payment Processing Options: fff; Preferred Payment Option: ggg; and Post Payment Processing Option: hhh. Although only a limited amount of POS terminal identifiers and additional information is shown in FIG. 5, it will be appreciated by those skilled in the art that the reference to FIG. 5 is only exemplary and any number of POS terminal identifiers and any amount of additional information may be included in the second list without departing from the scope of the invention.

Figure 6:
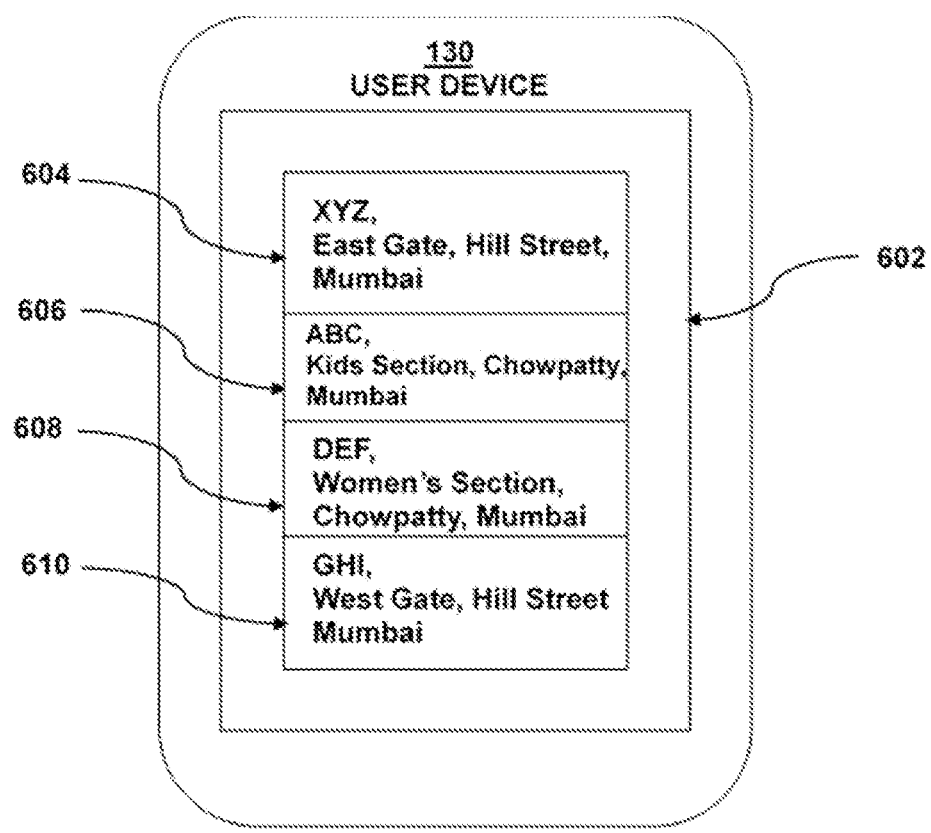
FIG. 6 illustrates an exemplary view of the graphical user interface of the user equipment [130] displaying a list of available POS terminals, in accordance with exemplary embodiments of the present disclosure.

FIG. 6 illustrates an exemplary view of the graphical user interface of the user equipment [130] displaying a list of available POS terminals, in accordance with exemplary embodiments of the present disclosure. As shown in FIG. 6, the user equipment 130 includes a display 602, configured to display the second list received from the first server device [110]. The invention encompasses displaying the second list within the graphical user interface of the digital wallet application installed on the user equipment [130]. As shown in FIG. 6, the displayed second list includes various POS terminal names and their corresponding additional information [604, 606, 608, 610]. The invention also encompasses displaying the 'discount code' for each of the POS terminal identifiers in the second list. The 'discount code' can include discount on aggregated amount of purchase or discount on individual products/services. Although only a limited amount of POS terminals and additional information is shown in FIG. 6, it will be appreciated by those skilled in the art that the reference to FIG. 6 is only exemplary and any number of POS terminals and any amount of additional information may be displayed at the user equipment [130] without departing from the scope of the invention.

Figure 7:
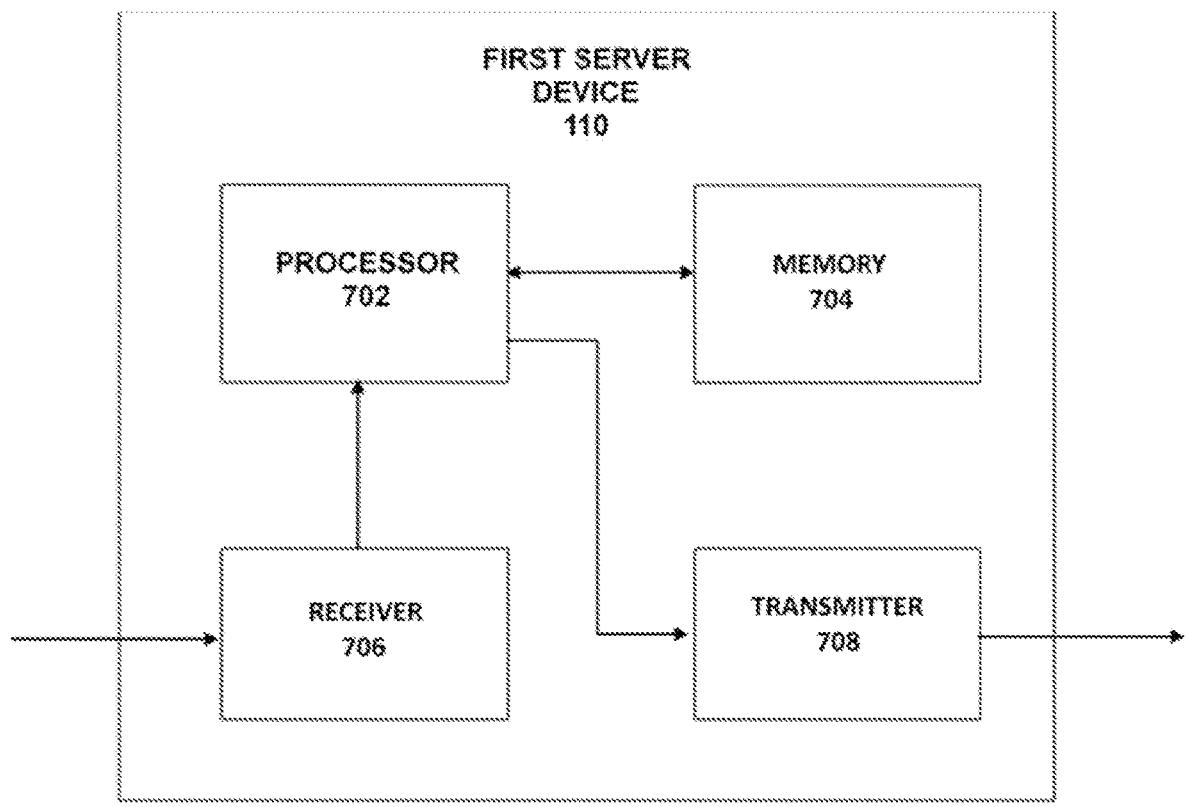
FIG. 7 illustrates a block diagram of the first server device [110] in accordance with an embodiment of the present disclosure.

Referring to FIG. 7, a block diagram of the first server device [110] is disclosed. As shown, the first server device [110] may include one or more processors, such as a processor [702], at least one memory [704], a receiver [706], and a transmitter [708]. The processor [702] may be communicably coupled with the receiver [706] to receive signals from the user equipment [130] and to receive signals from the second server device [120]. The receiver [706] is configured to receive the one or more service set identifiers, the signal strength information associated with said service set identifiers and the UE identifier from the user equipment [130]. The receiver [706] is also configured to receive the first list from the second server device [120], the first list comprising one or more advertised valid service set identifiers, the signal strength information and at least one POS terminal identifier corresponding to each of said valid service set identifiers.

The transmitter [708] is configured to transmit the one or more service set identifiers, the signal strength information associated with said service set identifiers and the UE identifier to the second server device [120].

The processor [702] is configured to generate the second list based on the first list received from the second server device. The generation of the first list has been discussed in detail in the above paragraphs with reference to FIG. 3 and is not repeated herein to avoid redundancy. The processor [702] is in communication with the memory [704], wherein the memory [704] includes program modules such as routines, programs, objects, components, data structures and the like, which perform particular tasks to be executed by the processor [702]. The memory [704] is also configured to store the one or more service set identifiers, the signal strength information associated with said service set identifiers and the UE identifier received from the user equipment [130]. The memory is also configured to store the second list generated by the processor [702] and the first list received from the second server device [120].

The memory [704] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 8:
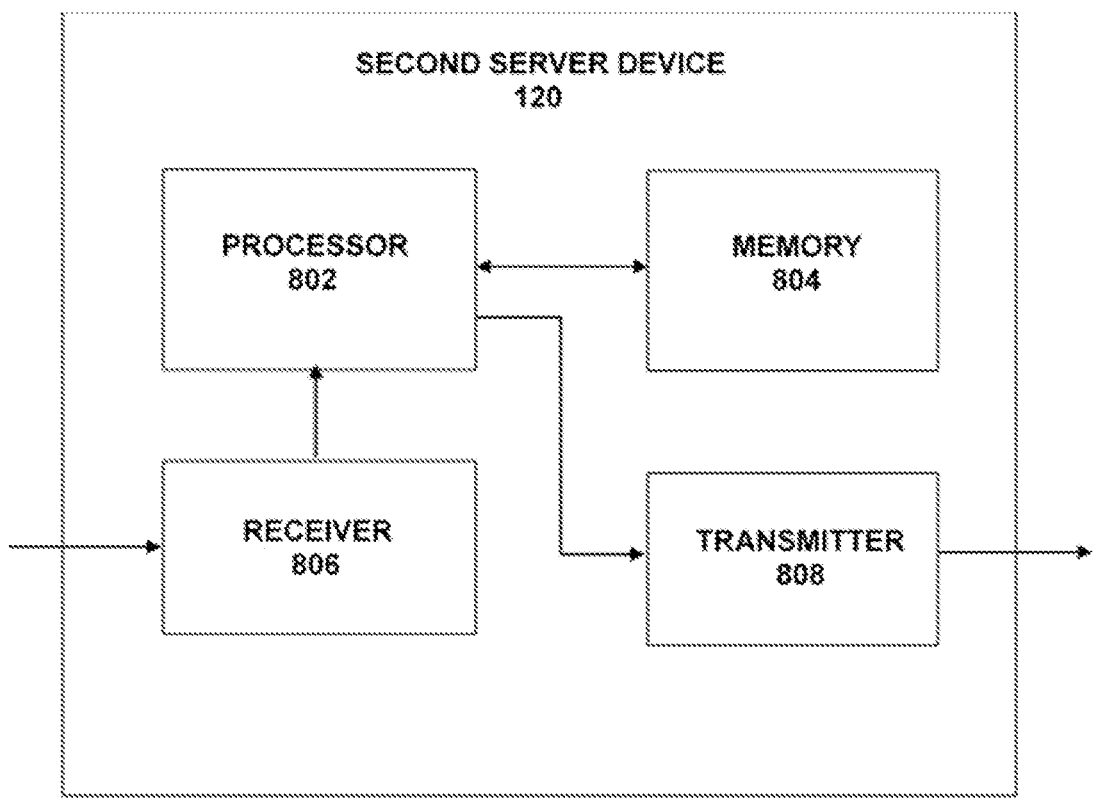
FIG. 8 illustrates a block diagram of the second server device [120], in accordance with an embodiment of the present disclosure.

Referring to FIG. 8, a block diagram of the second server device [120] is disclosed. As shown, the second server device [120] may include one or more processors, such as a processor [802], at least one memory [804], a receiver [806], and a transmitter [808]. The processor [802] may be communicably coupled with the receiver [806] to receive signals from the first server device [110]. The receiver [806] is configured to receive the one or more service set identifiers, the UE identifier, the signal strength information of the service set identifiers and the first server device identifier from the first server device [110]. The processor [802] is configured to generate a first list based on the received service set identifiers, the UE identifier, the signal strength information of the service set identifiers and the first server device identifier. The processor [802] is in communication with the memory [804], wherein the memory [804] includes program modules such as routines, programs, objects, components, data structures and the like, which perform particular tasks to be executed by the processor [802]. The memory [804] is configured to store the one or more service set identifiers, the UE identifier, the signal strength information of the service set identifiers and the first server device identifier received from the first server device [110]. The memory [804] is also configured to store the first list generated by the processor [802].

The memory [804] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof. The transmitter [808] is configured to transmit the second list generated by the processor [802].

Figure 9:
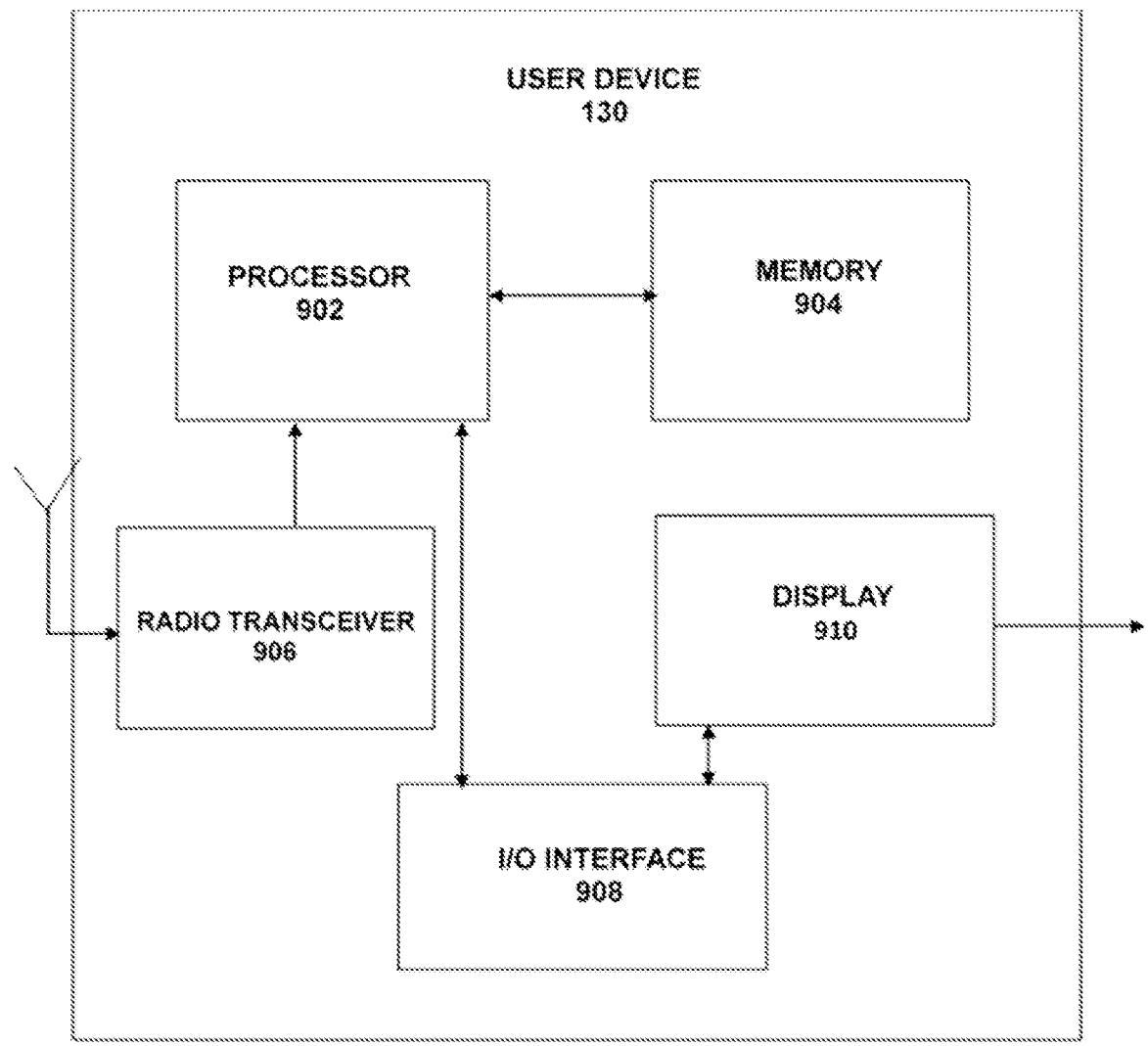
FIG. 9 illustrates a block diagram of the user equipment [130], in accordance with an embodiment of the present disclosure.

Referring to FIG. 9, a block diagram of the user device [130] is disclosed. As shown, the user device [130] may include one or more processors, such as a processor [902], one or more memories, such as memory [904], a transceiver [906], one or more I/O interfaces, such as an I/O interface [908] and a display [910]. The processor [902] may be communicably coupled with the transceiver [906] to receive signals from one or more access points [105] located in vicinity of one or more POS terminals. The processor [902] is configured to identify one or more advertised service set identifiers corresponding to the one or more access points [105] based on the received signals and determine a signal strength information of the received signals associated with the one or more service set identifiers.

Further, the transceiver [906] is configured to transmit signals generated by the processor [902], wherein the signals generated by the processor [902] may include the signal strength information, the one or more service set identifiers, and the UE identifier. The processor [902] is in communication with the memory [904], wherein the memory [904] includes program modules such as routines, programs, objects, components, data structures and the like, which perform particular tasks to be executed by the processor [902]. The transceiver [906] is further configured to receive a second list from the first server device [110], said second list comprising said at least one POS terminal identifier corresponding to each of said valid service set identifiers and an additional information corresponding to said at least one POS terminal.

The user equipment [130] may receive user inputs through the I/O interface [908]. In one embodiment, the display [910] may be utilized to receive user inputs from a user using the user device [130], wherein the display [910] may be a touch screen display. The I/O interface [908] is also configured to receive an input indicating selection of a payment processing option for wireless payment, wherein said payment processing option is selected from the displayed second list. The I/O interfaces [908] may include a variety of software and hardware interfaces, for instance, interface for peripheral device(s) such as a keyboard, a mouse, a scanner, an external memory, a printer and the like.

The display unit [910] is configured to display at least a graphical user interface of the digital wallet application. Further, the display unit [910] is configured to display the second list wherein at least one POS terminal, corresponding to said at least one POS terminal identifier in the second list is available for wireless payment.

As evident from the above description, the present disclosure provides for a method and system of wireless payment that automatically provides a list of available POS terminals to the user who wishes to make a payment using any payment instruments such as digital wallet, credit cards, debit cards, net banking, UPI, etc. The present disclosure ensures that manual intervention of the user to select the POS by scanning the bar code or inputting a phone number of the merchant is eliminated thereby making the wireless payment process more efficient. Therefore, the automatic, efficient, faster and easier discovery of the POS terminals during payment process via payment instruments by using the techniques described herein results in significant technical advancement in the field of payments in the Wi-Fi ecosystem. The payment instruments can include saving the users pay credentials based on the permission and provide seamless payment mechanism for auto-pay.

The units, interfaces, modules, and/or components depicted in the figures and described herein may be present in the form of a hardware, a software and a combination thereof. Connection/s shown between these units/components/modules/interfaces in the exemplary system architecture may interact with each other through various wired links, wireless links, logical links and/or physical links. Further, the units/components/modules/interfaces may be connected in other possible ways.

According to one embodiment of the present disclosure, the first server device [110] and the second server device [120] are special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The first server device [110] and the second server device [120], in addition to the components described above, may include a bus or other communication mechanism for communicating information.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method of wireless payment, the method comprising:
   transmitting, from a user equipment to a first server device, a user equipment (UE) identifier, one or more advertised service set identifiers and a signal strength information associated with the one or more advertised service set identifiers, wherein
   the one or more advertised service set identifiers correspond to one or more access points from which wireless signals are received by the user equipment;
   transmitting, from the first server device to a second server device, the received one or more advertised service set identifiers, the UE identifier, the signal strength information and a first server device identifier;
   generating, by the second server device, a first list based on the received one or more advertised service set identifiers, the UE identifier and the first server device identifier, wherein the first list comprises one or more valid service set identifiers and at least one Point-Of-Sale (POS) terminal identifier corresponding to each of said valid service set identifiers;
   transmitting, from the second server device to the first server device, the first list;
   generating, by the first server device, a second list based on the first list, wherein the second list comprises said at least one POS terminal identifier corresponding to each of said valid service set identifiers and an additional information corresponding to said at least one POS terminal identifier;
   transmitting, by the first server device to the user equipment, the second list;
   displaying, the second list by the user equipment, wherein the at least one POS terminal corresponding to said at least one POS terminal identifier in the second list is available for wireless payment; and
   receiving, at the user equipment, an input indicating selection of a payment processing option for wireless payment, wherein said payment processing option is selected from the displayed second list.

2. The method as claimed in claim 1, further comprising sorting one of the first list, the second list and a combination thereof, based on the received signal strength information associated with the one or more advertised service set identifiers.

3. The method as claimed in claim 1, further comprising receiving, at the user equipment, an input indicating the selection of a preferred payment option.

4. A system of wireless payment, comprising:
- at least one POS terminal connected to one or more access points, wherein said access points are associated with one or more service set identifiers and said access points are configured to transmit wireless signals;
- a user equipment, configured to receive wireless signals from the one or more access points, identify one or more advertised service set identifiers corresponding to the one or more access points based on the received wireless signals, determine a signal strength information of the received signals associated with the one or more service set identifiers, and transmit a user equipment (UE) identifier, said one or more advertised service set identifiers and the signal strength information associated with the one or more advertised service set identifiers;
- a first server device connected to the user equipment, said first server device configured to receive said UE identifier, said one or more advertised service set identifiers and said signal strength information, from the user equipment, and transmit the received one or more advertised service set identifiers, the UE identifier, the signal strength information and a first server device identifier; and
- a second server device connected to the first server device and said at least one Point-Of-Sale (POS) terminal, said second server device configured to receive one or more advertised service set identifiers, the UE identifier and the first server device identifier, from the first server device, generate a first list based on the received one or more service advertised set identifiers, the UE identifier and the first server device identifier, wherein the first list comprises one or more valid service set identifiers and at least one POS terminal identifier corresponding to each of said valid service set identifiers, and transmit, from the second server device to the first server device, the first list;
- wherein, the first server device is further configured to generate a second list based on the first list, wherein the second list comprises said at least one POS terminal identifier corresponding to each of said valid service set identifiers and an additional information corresponding to said at least one POS terminal identifier, and transmit the second list to the user equipment, and
- wherein the user equipment is further configured to display the second list, wherein the at least one POS terminal corresponding to said at least one POS terminal identifier in the second list is available for wireless payment, and receive an input indicating selection of a payment processing option for wireless payment, wherein said payment processing option is selected from the displayed second list.

5. The system as claimed in claim 4, wherein the one or more access points are in vicinity with the at least one user equipment or the POS terminal.

6. The system as claimed in claim 4, wherein the additional information includes one or more of a merchant logo, a merchant name, a store address, a store location, a discount code, at least one payment processing option and at least one preferred payment option.

* * * * *